United States Patent
Murasawa et al.

(10) Patent No.: US 9,744,920 B2
(45) Date of Patent: Aug. 29, 2017

(54) NOISE INSULATION STRUCTURE OF CABIN FLOOR

(71) Applicant: MAZDA MOTOR CORPORATION, Hiroshima (JP)

(72) Inventors: Eiji Murasawa, Hiroshima (JP); Naoko Yorozu, Hiroshima (JP); Masanori Honda, Hiroshima (JP); Tetsunori Hada, Hiroshima (JP); Yuki Nakatani, Hiroshima (JP); Takao Maruko, Hiroshima (JP)

(73) Assignee: MAZDA MOTOR CORPORATION, Hiroshima (JP)

( * ) Notice: Subject to any disclaimer, the term of this patent is extended or adjusted under 35 U.S.C. 154(b) by 0 days.

(21) Appl. No.: 15/091,937

(22) Filed: Apr. 6, 2016

(65) Prior Publication Data

US 2016/0311382 A1 Oct. 27, 2016

(30) Foreign Application Priority Data

Apr. 21, 2015 (JP) .................................. 2015-086456
Jun. 23, 2015 (JP) .................................. 2015-125361

(51) Int. Cl.
  *B60R 13/08* (2006.01)
  *B60N 3/04* (2006.01)

(52) U.S. Cl.
  CPC ............ *B60R 13/083* (2013.01); *B60N 3/042* (2013.01)

(58) Field of Classification Search
  CPC ........ B60R 13/083; B60N 3/04; B60N 3/042; B60N 3/046; B60N 3/048
  USPC ............................................. 296/39.3, 97.23
  See application file for complete search history.

(56) References Cited

U.S. PATENT DOCUMENTS

| | | | | |
|---|---|---|---|---|
| 4,174,991 A | * | 11/1979 | Reuben | B29D 99/0057 156/242 |
| 6,382,350 B1 | * | 5/2002 | Jezewski | B32B 3/266 181/290 |
| 6,547,301 B1 | * | 4/2003 | Keller | B60H 1/0055 165/42 |
| 6,685,250 B2 | | 2/2004 | Misaji et al. | |
| 7,182,994 B1 | * | 2/2007 | Scott | B32B 3/30 180/290 |
| 2002/0197446 A1 | * | 12/2002 | Gensler | B60N 3/046 428/98 |
| 2003/0096079 A1 | * | 5/2003 | Messina | B32B 27/40 428/85 |

(Continued)

FOREIGN PATENT DOCUMENTS

JP  2008-285026 A  11/2008

*Primary Examiner* — Gregory Blankenship
(74) *Attorney, Agent, or Firm* — Studebaker & Brackett PC (57) ABSTRACT

A floor carpet is placed on a floor panel forming a cabin floor surface. The floor carpet comprises a skin layer which is configured to block an airflow therethrough and a sound-absorption layer which is made of a sound-absorption material and configured to allow an airflow therein, the sound-absorption layer being provided below the skin layer to contact the floor panel at a lower face thereof. A space between the skin layer and the floor panel (a space portion where the sound-absorption layer is arranged) is sealed with a seal member which is configured to surround the sound-absorption layer. The seal member is pressed against the floor panel (tightly) by a pressing member which is fixed to a vehicle-body side with a fixing tool.

10 Claims, 10 Drawing Sheets

(56) References Cited

U.S. PATENT DOCUMENTS

| | | | | |
|---|---|---|---|---|
| 2004/0262935 | A1* | 12/2004 | Harima | B62D 43/10 |
| | | | | 296/37.3 |
| 2005/0006173 | A1* | 1/2005 | Albin, Jr. | B32B 3/30 |
| | | | | 181/290 |
| 2006/0216468 | A1* | 9/2006 | Jeon | B60N 3/046 |
| | | | | 428/119 |
| 2009/0117320 | A1* | 5/2009 | Hwang | B60R 13/083 |
| | | | | 428/85 |
| 2010/0060038 | A1* | 3/2010 | Takakura | B60R 13/083 |
| | | | | 296/193.07 |
| 2011/0039051 | A1* | 2/2011 | Flowers, Jr. | B32B 3/30 |
| | | | | 428/78 |
| 2016/0022811 | A1* | 1/2016 | Vollmer | A61K 39/3955 |
| | | | | 424/133.1 |
| 2016/0236603 | A1* | 8/2016 | Stroud | B60N 3/048 |
| 2016/0311382 | A1* | 10/2016 | Murasawa | B60N 3/042 |
| 2017/0008462 | A1* | 1/2017 | Taniguchi | B60R 13/0861 |

\* cited by examiner

NOISE INSULATION STRUCTURE OF CABIN FLOOR

BACKGROUND OF THE INVENTION

The present invention relates to a noise insulation structure of a cabin floor.

In an automotive vehicle as a vehicle, it is important to effectively reduce a noise transmitted to a cabin through a floor panel, in particular, to reduce a road noise by means of a floor carpet.

Japanese Patent Laid-Open Publication No. 2008-285026 discloses a structure in which plural layers of floor carpet are provided in order to insulate the noise sufficiently. Further, U.S. Pat. No. 6,685,250 discloses a noise insulation mechanism of the floor carpet which is explained in a mass-and-spring base manner.

It is general that the thickness of a sound-absorption material is set to be rather thick for improving the insulation property of the noise transmitted from the floor panel. In this case, however, there is a concern that the weight of the floor carpet may increase greatly and the height (vertical length) of the cabin may be deteriorated.

SUMMARY OF THE INVENTION

An object of the present invention is to provide a noise insulation structure of a cabin floor which can properly improve the insulation property of the noise transmitted from the floor panel, without improperly increasing the weight and thickness of the floor carpet.

The present invention has been devised by focusing on the fact that the space where the sound-absorption material is provided forms an air-flow layer (i.e., a layer configured to allow an airflow therein), and the present invention is configured so that the acoustic energy of the road noise can be more properly consumed by sealing a periphery of this air-flow layer, thereby making the air in the air-flow layer link vibrations of the floor panel with vibrations of a carpet skin properly. Accordingly, the noise insulation property can be improved without improperly increasing thickness of the floor carpet.

Specifically, the present invention is a noise insulation structure of a cabin floor, comprising a floor panel forming a cabin floor surface, a floor carpet placed on the floor panel, the floor carpet comprising a skin layer which is configured to block an airflow therethrough and a sound-absorption layer which is made of a sound-absorption material and configured to allow an airflow therein, the sound-absorption layer being provided below the skin layer to contact the floor panel at a lower face thereof, and a seal member configured to block an airflow therethrough, the seal member being provided below the skin layer of the floor carpet, surrounding the sound-absorption layer, to contact the floor panel at a lower face thereof such that a space between the skin layer and the floor panel, where the noise-absorption layer is provided, is sealed therewith.

According to the present invention, the noise insulation effect with resonance can be sufficiently obtained by providing a sealed structure of the space where the sound-absorption layer is provided. Thus, the noise insulation effect can be sufficiently enhanced, making the floor carpet properly lightweight and thin, due to a synergistic effect of the noise insulation effect with sound absorption of the sound-absorption layer and the noise insulation effect with the skin layer configured to block the airflow therethrough.

In an embodiment of the present invention, the floor panel comprises plural substantially-flat floor pan portions which are formed in a longitudinally-and-laterally split manner, and the seal member is configured to surround each peripheral portion of the plural floor pan portions. This embodiment, in which the sealed structure is formed independently for each of the substantially-flat floor pan portions having a big problem of the noise transmission, is preferable in enhancing the noise insulation effect. Further, this embodiment is preferable in simplifying the sealed structure, ensuring the appropriate seal performance with the seal member. Moreover, when maintenance works are applied to various kinds of harness and the like which are arranged between the floor carpet and the floor panel after the floor carpet has been placed, sealing only part of the seal member necessary for the maintenance can be released, so that this embodiment is preferable in improving the maintenance performance In another embodiment of the present invention, the seal member is pressed against the floor panel by using a pressing member which is detachably fixed to a vehicle-body reinforcing member positioned adjacent to the floor panel with a fixing tool. This embodiment in which the floor carpet is fixed to the floor panel by using the pressing member is preferable in sufficiently obtaining the above-described effect of the present invention by ensuring the appropriate seal performance. Further, when the maintenance is applied, part of the floor carpet can be peeled off from the floor panel by releasing the fixation with the fixing tool, so that this embodiment is preferable in ensuring the maintenance performance of the various kinds of harness and the like provided on the floor panel.

In another embodiment of the present invention, the seal member is formed integrally with the skin layer of the floor carpet. According to this embodiment, the seal member is automatically located at a specified position when the floor carpet is placed on the floor panel, thereby facilitating assembling of the noise insulation structure.

In another embodiment of the present invention, the seal member and the pressing member are respectively formed integrally with the skin layer of the floor carpet. According to this embodiment, the seal member and the pressing member are automatically located at specified positions respectively when the floor carpet is placed on the floor panel, thereby facilitating the assembling of the noise insulation structure.

In another embodiment of the present invention, a flat portion having a flat upper face is formed on a vehicle-body side, and the seal member contacts the flat portion. This embodiment is preferable in sufficiently enhancing the noise insulation effect by ensuring the seal performance of the seal member for the floor panel.

In another embodiment of the present invention, the flat portion is provided by forming a shoulder portion partially at the floor panel or at a reinforcing member positioned at a peripheral portion of the floor panel. According to this embodiment, the flat portion can be formed in a simple manner of forming the shoulder portion.

In another embodiment of the present invention, the seal member is made of a foamed rubber-based seal material. This embodiment can provide the appropriate seal member which ensures the sufficient seal performance for a long term.

In another embodiment of the present invention, the above-described sealed space is configured to connect to a space of a closed cross section of a vehicle-body reinforcing member provided adjacent to the floor panel. According to this embodiment, the noise insulation with the resonance can be sufficiently obtained by utilizing the space of the closed cross section of the reinforcing member. In particular, the noise insulation effect can be enhanced without improperly increasing the weight and thickness of the floor carpet, so that this embodiment is preferable in avoiding any improper weight or costs-up of the vehicle.

In another embodiment of the present invention, the vehicle-body reinforcing member is a cross member extending in a vehicle width direction on the floor panel, which is joined to the floor panel via a flange portion thereof, and a protrusion portion to connect the space of the closed cross section of the cross member to the sound-absorption layer of the floor carpet is provided at the flange portion of the cross member. According to this embodiment, the connection of the space of the closed cross section of the cross member and the sound-absorption layer of the floor carpet can be achieved simply by using the protrusion portion formed at the flange portion of the cross member. Further, this embodiment is preferable in suppressing an improperly big change of a shape or structure of the cross member.

Other features, aspects, and advantages of the present invention will become apparent from the following description which refers to the accompanying drawings.

DETAILED DESCRIPTION OF THE INVENTION

Hereafter, embodiments of the present invention will be described referring to the accompanying drawings.

Figure 1:
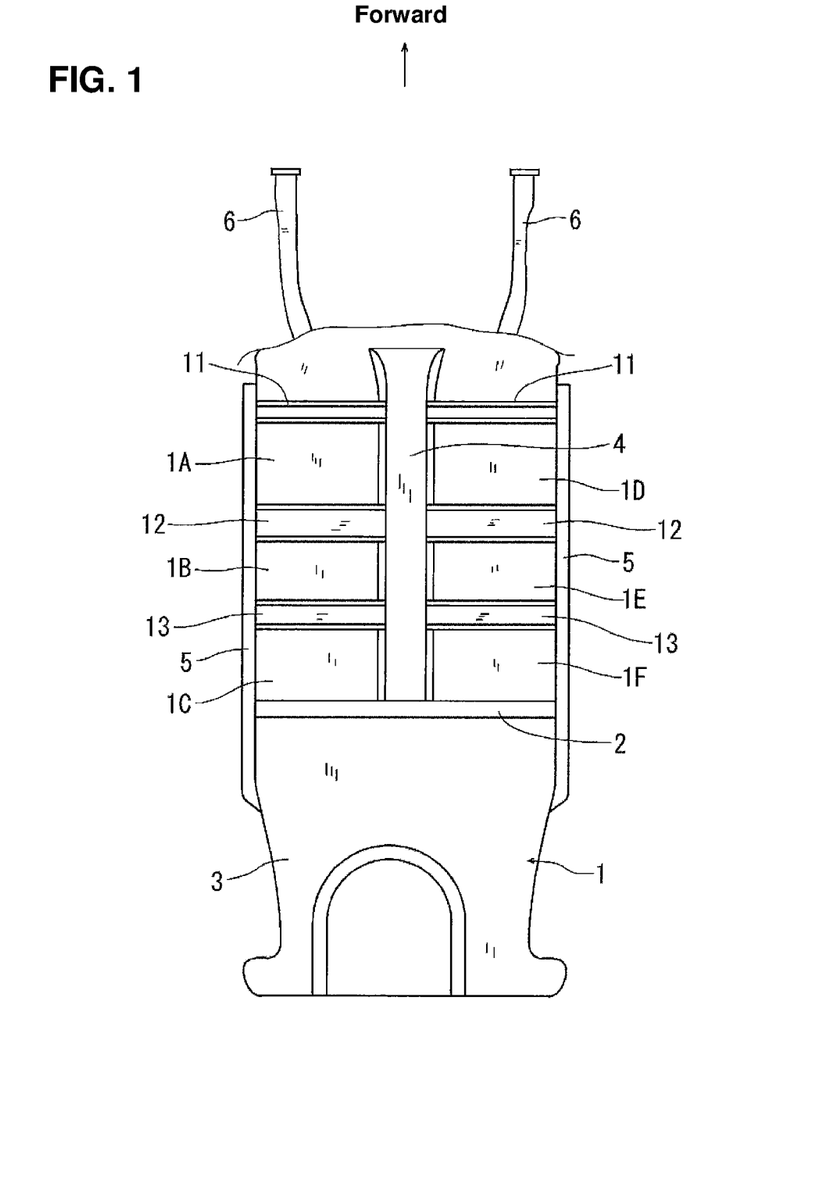
FIG. 1 is a plan view showing a portion of a floor panel of a vehicle to which the present invention is applied.

In FIG. 1, reference character 1 denotes a floor panel which forms a cabin floor surface, on which front-and-rear two row seats are disposed. A rear floor panel 3 is provided continuously from a rear portion of the floor panel 1 via a kick-up portion 2. A tunnel portion 4 as a reinforcing member is provided to protrude upward and extend in a vehicle longitudinal direction at a central portion, in a vehicle width direction, of the floor panel 1. Further, an end portion, in the vehicle width direction, of the floor panel 1 is joined to a side sill 5 as another reinforcing member which extends in the vehicle longitudinal direction. In the figure, reference character 6 denotes a pair of right-and-left front frames, and reference character 7 denotes a dash panel which partitions a cabin from an engine room.

Three pairs of cross members 11-13 which extend in the vehicle width direction are joined on the floor panel 1. The front cross member 11 is positioned near a border of the front panel 1 and the dash panel 7 (near a foot of a driver seated in a driver's seat) and connected to the tunnel portion 4 and the side sill 5. The cross member 12, to which a front seat is attached, interconnects the tunnel portion 4 and the side sill 5. The rear cross member 13, to which a rear seat is attached, interconnects the tunnel portion 4 and the side sill 5.

The side sill 5, which is further another reinforcing member, is configured to have a space of a closed cross section therein. Likewise, each of the cross members 11-13 as another reinforcing member forms a space of a closed cross section therein together with the floor panel 1.

The floor panel 1 is partitioned by the tunnel portion 4 and the cross members 11-13 into six substantially-flat floor pan portions 1A-1F which are formed in a longitudinally-and-laterally split manner. The floor pan portions 1A-1C are positioned on the left side of the tunnel portion 4, and the floor pan portions 1D-1F are formed on the right side of the tunnel portion 4. These floor pan portions 1A-1F are configured to be slightly uneven but basically substantially flat, and a road noise from a road surface can be easily transmitted to the cabin through the floor pan portions 1A-1F.

Figure 2:
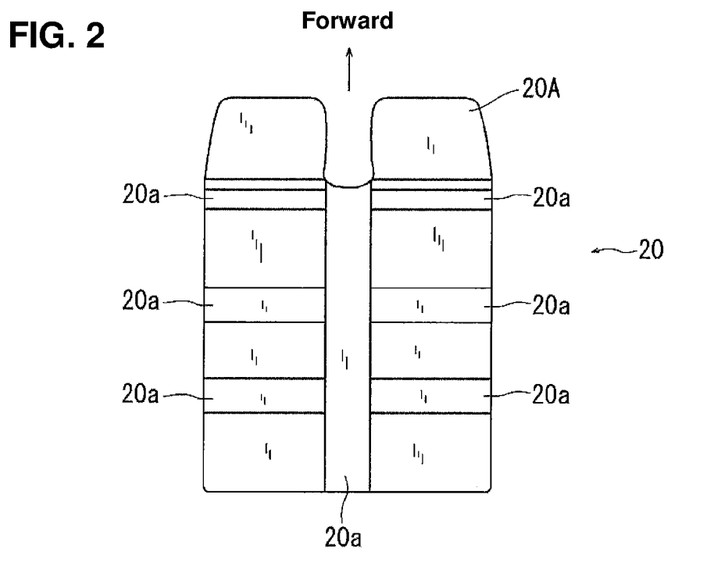
FIG. 2 is an upper-face view showing an example of a floor carpet in a state in which a pressing member is removed.
Figure 3:
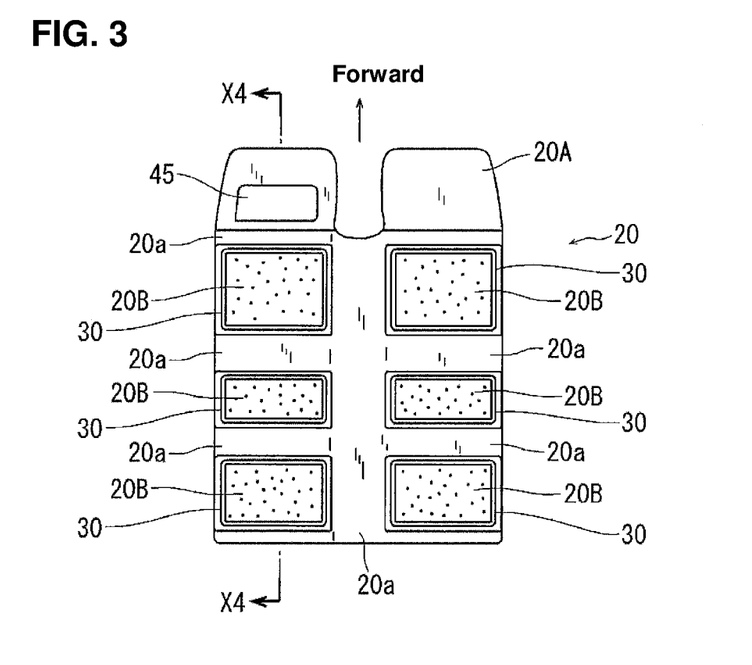
FIG. 3 is a lower-face view of the floor carpet shown in FIG. 2, when viewed from below.
Figure 4:
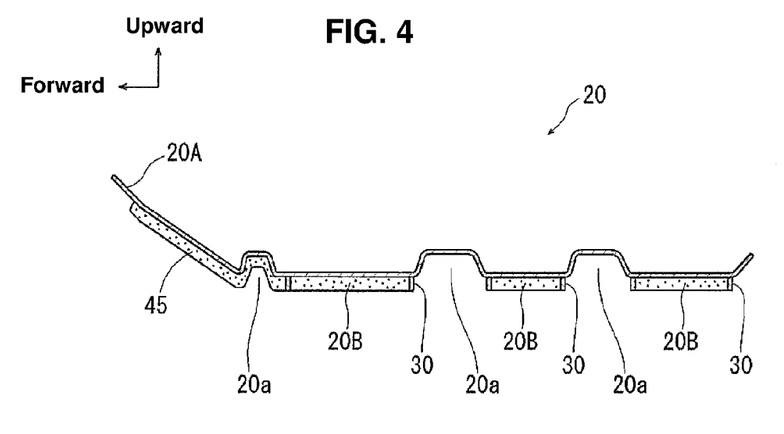
FIG. 4 is a sectional view taken along line X4-X4 of FIG. 3.

As shown in FIGS. 2-4, the floor carpet 20 is made of a sheet-shaped member in the embodiment, and placed on the floor panel 1, covering over a roughly entire area of the floor panel 1. Accordingly, the floor carpet 20 has protrusion portions 20*a* which are convex upward at positions which correspond to the tunnel portion 4 and the cross members 11-13. Herein, illustration of a pressing member, which will be described, is omitted in FIGS. 2-4.

The floor carpet 20 comprises a skin layer 20A which is configured to block an airflow therethrough and a sound-absorption layer 20B which is made of a sound-absorption material and provided below the skin layer 20A. The sound-absorption layer 20B is formed in a plural (six) split manner, corresponding to the above-described plural (six) floor pan portions 1A-1F and fixed to a lower face of the skin layer 20A. The shape of each of split parts of the sound-absorption layer 20B is rectangular, corresponding to a rectangular shape of each of the floor pan portions 1A-1F.

The skin layer 20A comprises a rubber-based base-seat layer having the sealability (airtight) and a skin provided on the rubber-based base-seat layer, which generally has the sealability. In a case in which this skin layer does not have the sealability, the skin layer can be formed by applying a thin sealing seat layer to its back side or the like. Herein, the skin layer 20A can be made of a single layer or plural layers, which are positioned on the sound-absorption layer 20B. Further, while the sound-absorption layer 20B can be made of fibers or the like, this embodiment uses recycled fibers of a plastic bottle. Further, the thickness of the sound-absorption layer 20B is set at about 15-20 mm, and the thickness and the weight of the floor carpet 20 including the skin layer 20A are set to be substantially the same as those of a conventional inexpensive floor carpet (such as a floor carpet of a popular car or middle-class vehicle).

Further, a seal member 30 is formed integrally with a lower face of the skin layer 20A (by using a double-sided tape, for example) in such a manner the seal member 30 surrounds a periphery of each part of the sound-absorption layer 20B. Each part of seal member 30 is formed in a rectangular-ring shape so as to surround an entire periphery of corresponding part of the sound-absorption layer 20B. The seal member 30 has the elasticity and the sealability, and is made of a foamed rubber-based seal material, for example.

Figure 6:
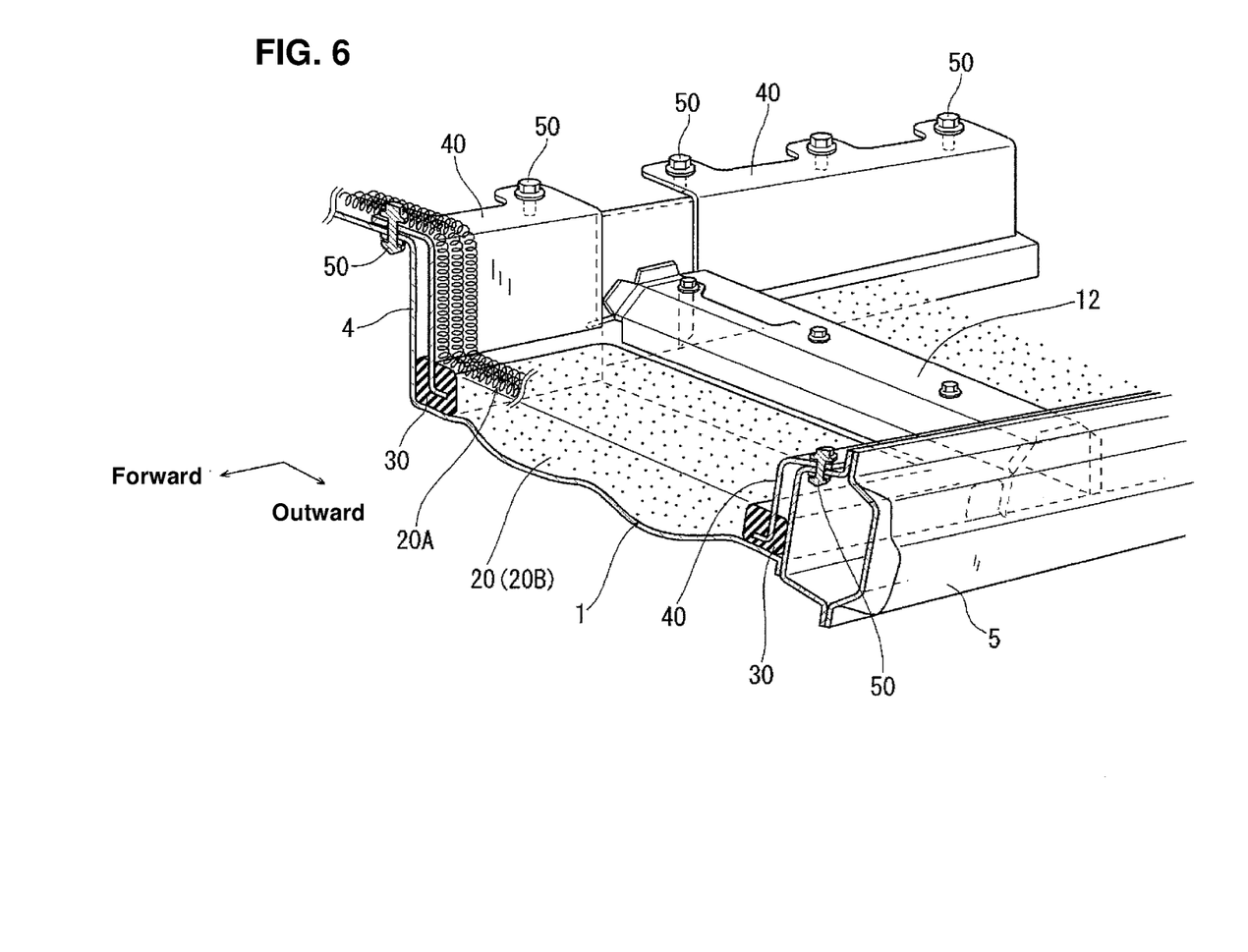
FIG. 6 is a sectional perspective of the floor carpet shown in FIGS. 2-4 in a state in which the floor carpet is placed on the floor panel, which corresponds to FIG. 5.

As shown in FIGS. 6-9, the floor carpet 20 is detachably fixed to the floor panel 1 by using a pressing member 40 which is made from metal or hard synthetic resin. Herein, the skin layer 20A is partially shown in FIG. 6, illustration of which is omitted in FIG. 8. The seal member 30 is pressed against the floor panel 1 via the pressing member 40 (tightly). That is, when the floor carpet 20 is fixed, a space between the skin layer 20A and the floor panel 1 (the floor pan portions 1A-1F) (a space where the sound-absorption layer 20B is provided) is sealed with the seal member 30. The pressing member 40 is formed integrally with the floor carpet 20 in advance as described later. Herein, according to the experiments, the degree of sealing (sealability) for obtaining the effect of the present invention required a pressure of 10 kPa or more acting on a lower face of the seal member 30.

The degree of sealing (sealability) obtained in this case is 95% or greater and close to 100%, when describing the percentage of a ratio of an opening area relative to a wall (a ratio of opening area/wall). According to the experiments, the noise insulation effect of 3.9 dB was able to be obtained by the present invention when the degree of sealing (sealability) was 100% in the frequency band of 400-1100 Hz, but when the degree of sealing (sealability) was 95%, the noise insulation effect decreased to a half of that. Herein, the degree of sealing (sealability) of a sound-absorption layer of a conventional vehicle is about 81% when described by the ratio of opening area/wall.

Next, a fixing example of the floor carpet 20 by using the pressing member 40 will be described. As an example of the pressing member 40 integrally formed with the floor carpet 20, there is the one shown in FIGS. 6 and 8, in which the pressing member 40 is integrally formed with right-and-left edge portions of the seal member 30 which extend in the vehicle longitudinal direction. That is, one end portion of the pressing member 40 is provided to extend into the seal member 30, and is integrally formed with the floor carpet 20 via the seal member 30. The other end portion of the pressing member 40 is provided to extend outward beyond an outer peripheral portion of the floor carpet 20 (the skin layer 20A), and is fixed with the fixing tool 50. A fixing position of the fixing tool 50 is located at the tunnel portion 4 for an inward side portion, in the vehicle width direction, of that, and located at the side sill 5 for an outward side portion, in the vehicle width direction, of that.

Figures 7, 8:
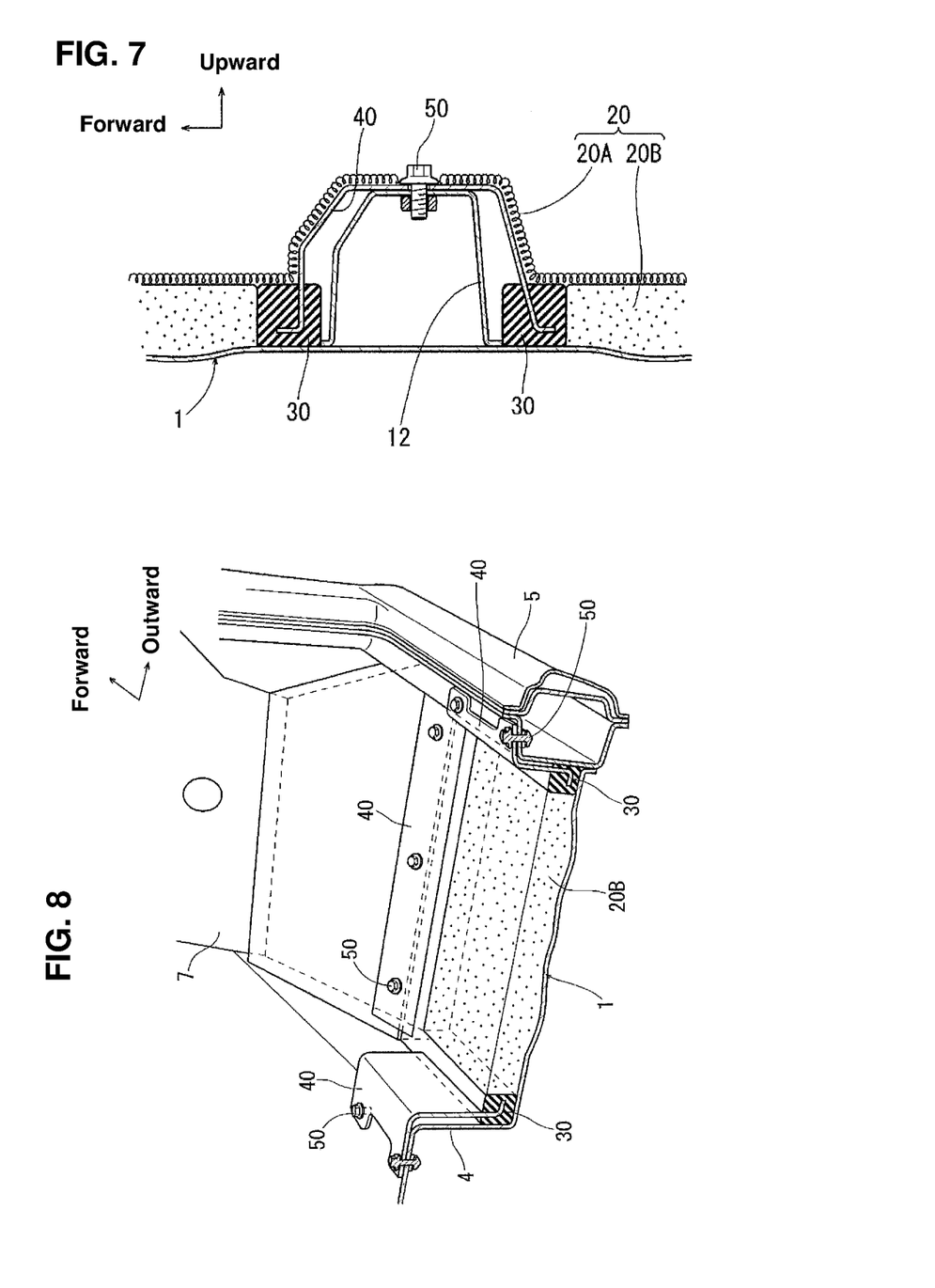
FIG. 7 is a side sectional view showing an attachment state of the floor carpet near a cross member.
FIG. 8 is a side perspective view showing an attachment state of the floor carpet near a front end portion of the floor carpet.

Further, there is a case in which the pressing member 40 integrally formed at the floor carpet 20 in advance is fixed to the cross member 12 or the cross member 13 as shown in FIG. 7. That is, the pressing member 40 is provided to straddle the cross member 12 (the cross member 13), and its front end portion and its rear end portion extend into the seal member 30, respectively, whereas its middle portion is fixed to the cross member 20 (the cross member 30) with the fixing tool 50.

Figure 9:
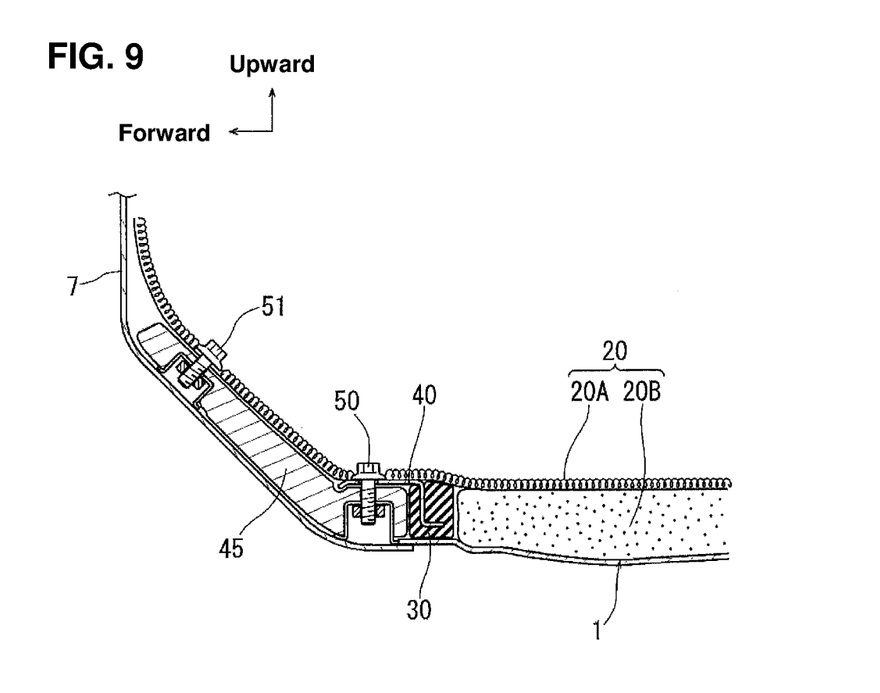
FIG. 9 is a side sectional view showing the attachment state of the floor carpet near the front end portion of the floor carpet.

Further, there is a case of the pressing member 40 integrally formed at the floor carpet 20 in advance as shown in FIGS. 8 and 9, for example. That is, a rear end portion of the pressing member 40 is provided to extend into the seal member 30 provided at the front end portion of the floor carpet 20, whereas a front end portion of the pressing member 40 is fixed to the cross member 11 with the fixing tool 50.

As shown in FIG. 9, a front end portion of the floor carpet 20 has the skin layer 20A extending forward more. That is, an accelerator pedal, a brake pedal, a clutch pedal or the like are arranged in an area from a front end portion of the floor panel 1 to a lower end portion of the dash panel 7, and a cushion member 45 is arranged in this area in order to provide a cushion property or the like for feet of the driver. This cushion member 45 is made of a styrene-foam plate, for example, which is integrally formed with the floor carpet 20 in advance (see FIG. 3 as well, for example). The skin layer 20A of the floor carpet 20 is provided to cover over the cushion member 45. Herein, in FIG. 9, reference character 51 denotes a fixing toll which fixes the skin layer 20A including the cushion member 45 to the floor panel 1.

Figure 5:
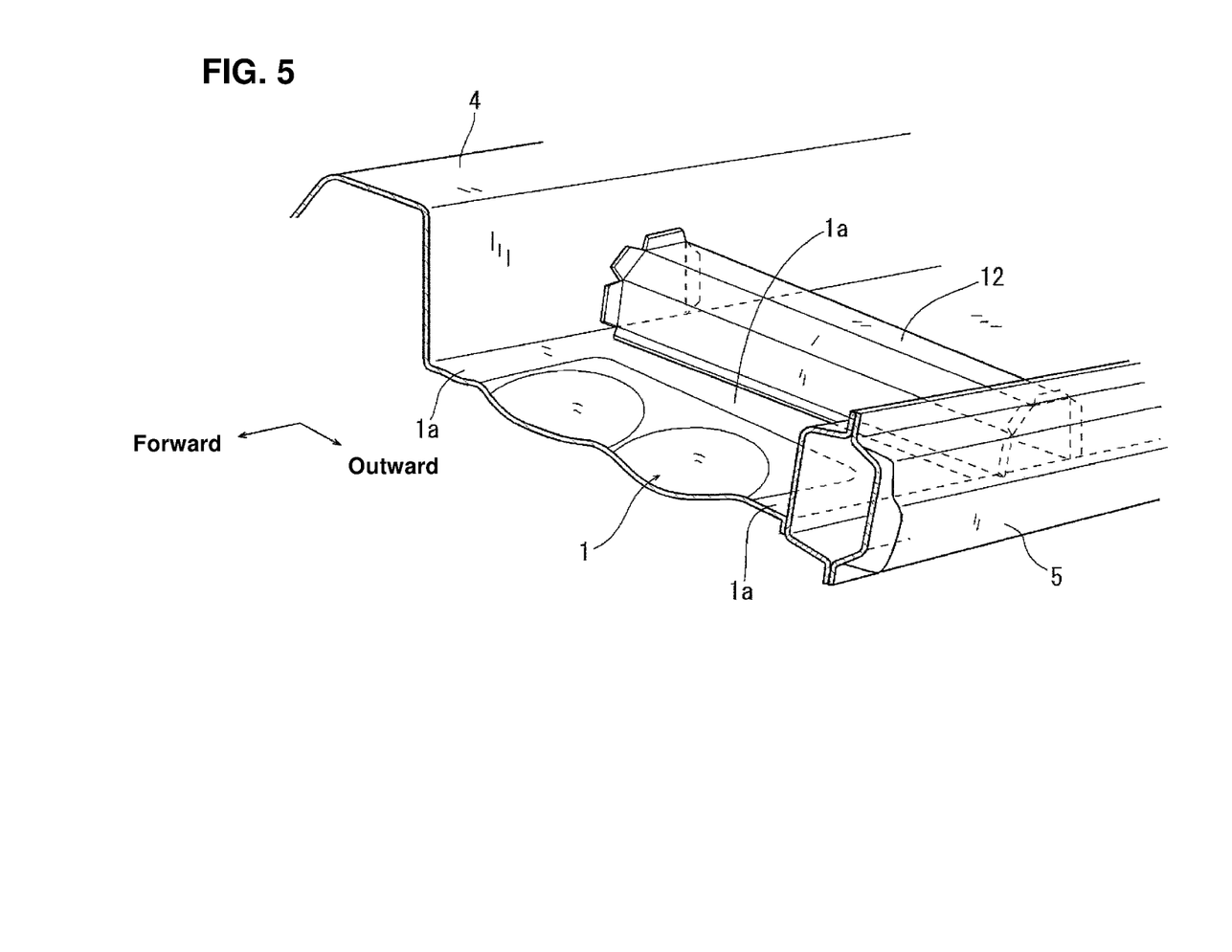
FIG. 5 is a sectional perspective view showing a portion of the floor panel in a state in which the floor panel is not placed yet.

Herein, as shown in FIG. 5, portions of the floor panel 1 against which the seal member 30 is pressed are formed in a flat shape, respectively, which are denoted by reference character 1a. By forming these flat portions 1a at the floor panel 1, the appropriate seal performance can be more properly ensured between the seal member 30 and the floor panel 1.

Figure 10:
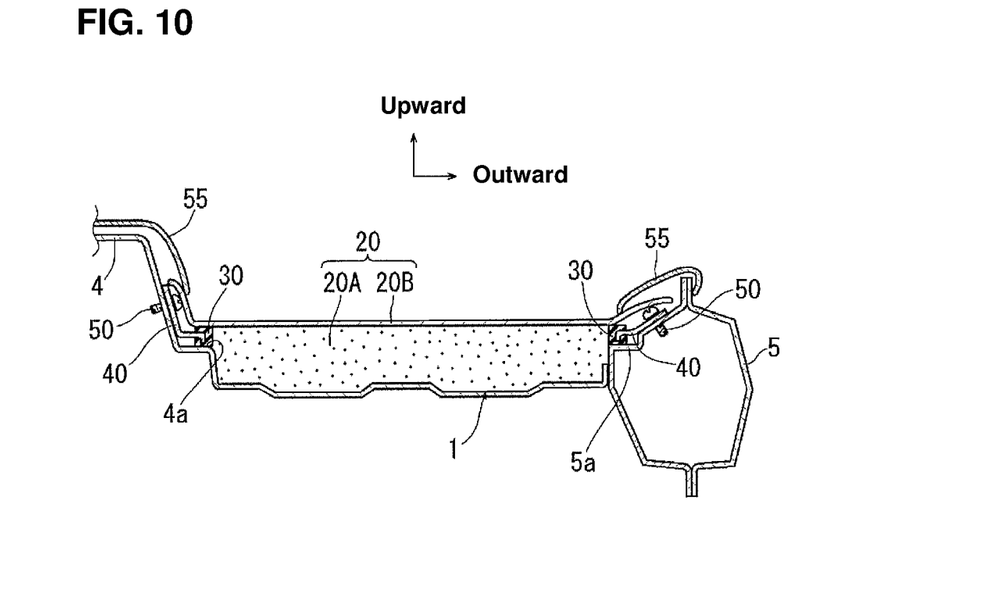
FIG. 10 is a sectional view showing another attachment example of the floor carpet.
Figure 11:
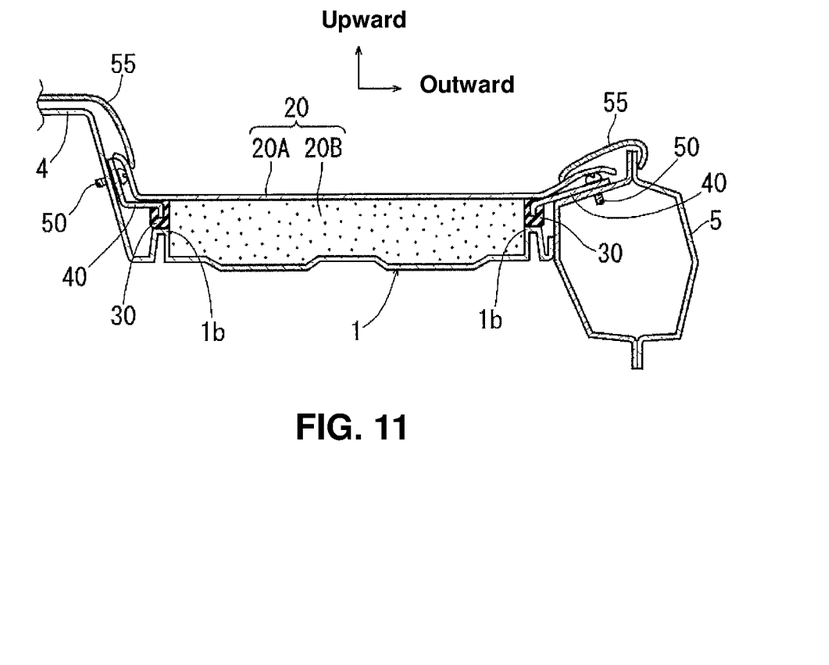
FIG. 11 is a sectional view showing further another attachment example of the floor carpet.

FIGS. 10 and 11 show modifications of the present invention. In the modification shown in FIG. 10 in which the flat portions against which the seal member 30 is pressed are formed on the vehicle-body side, a shoulder portion is formed at a member which is positioned at a peripheral portion of the seal member 30. Specifically, a shoulder portion is formed at the tunnel portion 4 and this shoulder portion is configured as a flat portion 4a. Meanwhile, another shoulder portion is formed at the side sill 5 which is positioned at the same height as a flat portion 5a. Likewise, a flat portion can be formed at the cross members 11-13 by this shoulder forming, which is not illustrated. In the figure, reference character 55 denotes a trim member.

In the modification shown in FIG. 11, a protrusion portion which protrudes upward is formed partially at a peripheral portion of each of the floor pan portions 1A-1F of the floor panel 1, and this protrusion portion is formed as a flat portion 1b against which the seal member 30 is pressed.

Figure 12:
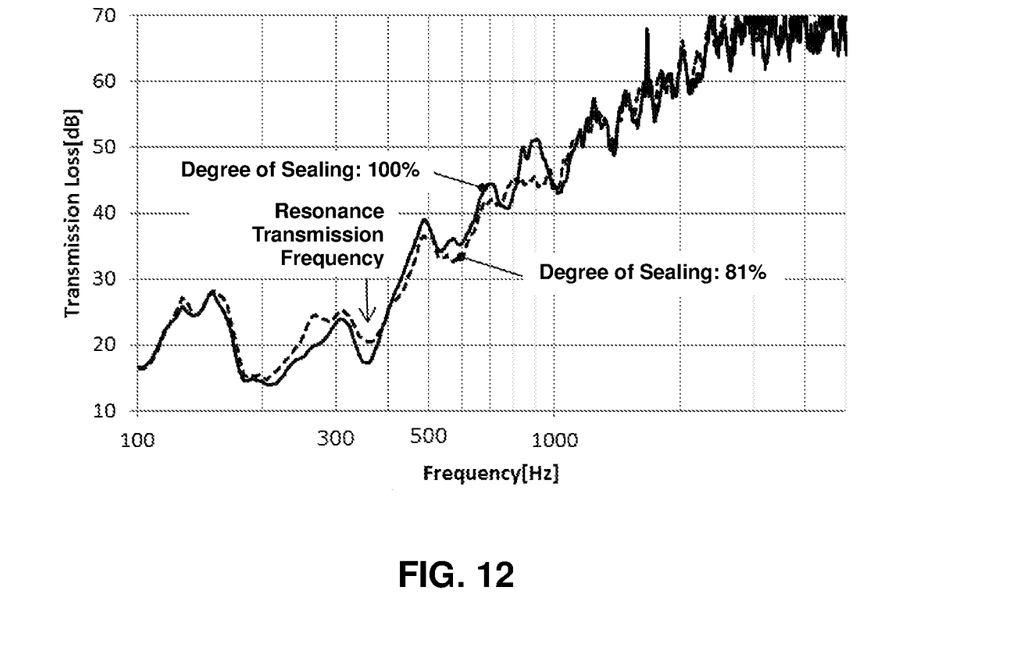
FIG. 12 is a diagram illustrating an effect of the present invention.

FIG. 12 illustrates the effect of the present invention. The abscissa represents the frequency of vibrations, and the ordinate represents the transmission loss of vibrations (the larger the transmission loss is, the more silent the inside of the cabin is). In the FIG. 12, a broken line shows a case in which a conventional (general) floor carpet is used, and a solid line shows the present invention. As shown in FIG. 12, the transmission loss can be properly decreased in a frequency range of 500-1000 Hz where a conversation of passengers may be improperly disturbed.

Meanwhile, it is understood that the transmission loss in the frequency range of 400 Hz or lower of the present invention is smaller than that of the conventional floor carpet. It can be considered that the resonance phenomenon, in which the sealed layer configured to allow the airflow therein (i.e., the sealed air-flow layer) synchronizes the vibration of the floor carpet with the vibration of the carpet skin layer, occurs in this frequency range. In the sealed structure of the present invention, the resonance phenomenon is unavoidable. Accordingly, the resonance frequency is decreased below 400 Hz so as not to disturb the passengers' conversation.

Herein, while it is needed to enlarge (increase) the volume of the layer configured to allow the airflow therein in order to decrease the resonance frequency, the distance between the floor panel and the skin layer of the floor carpet (i.e., the thickness of the floor carpet) cannot be large extremely. Accordingly, it may be configured such that the space between the floor panel and the skin layer of the floor carpet is connected to an inside space of a frame having a closed cross section which is provided adjacent to the floor panel.

Figure 13:
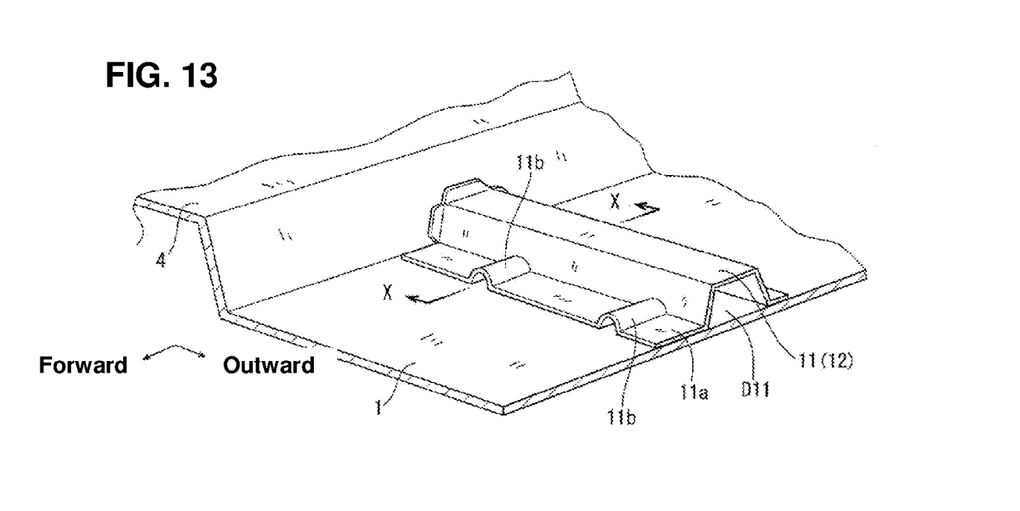
FIG. 13 is a perspective view of another embodiment of the present invention.

Specifically, as shown in FIG. 13, a protrusion portion 11b which protrudes upward is formed partially at a flange portion 11a of the cross member 11. This protrusion portion 11b connects to a space D11 of the closed cross section of the cross member 11.

Figure 14:
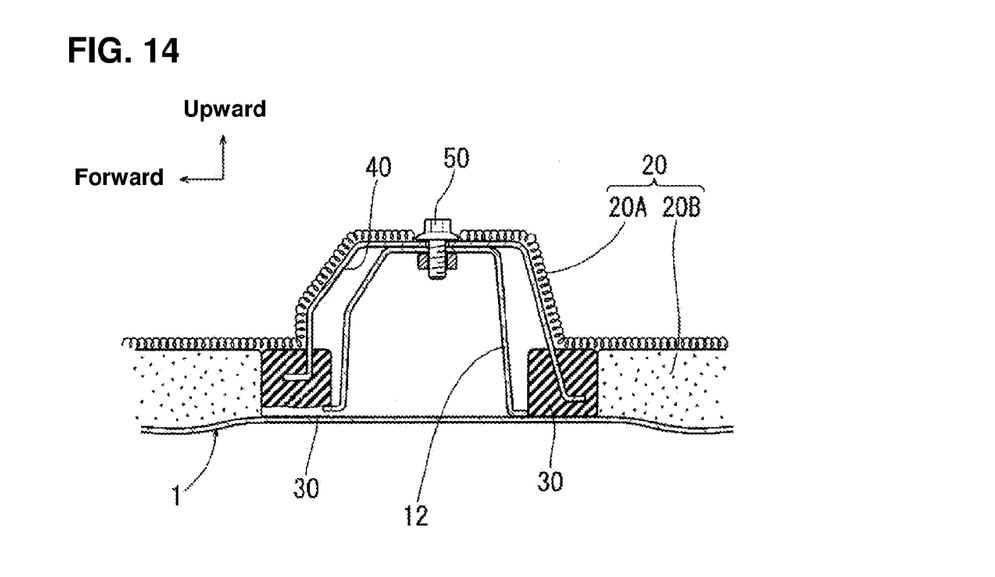
FIG. 14 is a sectional view taken along line X-X of FIG. 13.

FIG. 14 is a sectional view taken along line X-X of FIG. 13. Herein, as shown in FIG. 14, the total volume of the layer configured to allow the airflow therein can be increased by a volume of the space D11 of the closed cross section of the cross member 11 by means of the above-described protrusion portion 11a which interconnects the space D11 of the closed cross section of the cross member 11 and the space between the floor panel 1 and the skin layer 20A of the floor carpet 20 where the sound-absorption layer 20B is arranged, without making the thickness of the floor carpet 20 improperly large.

Figure 15:
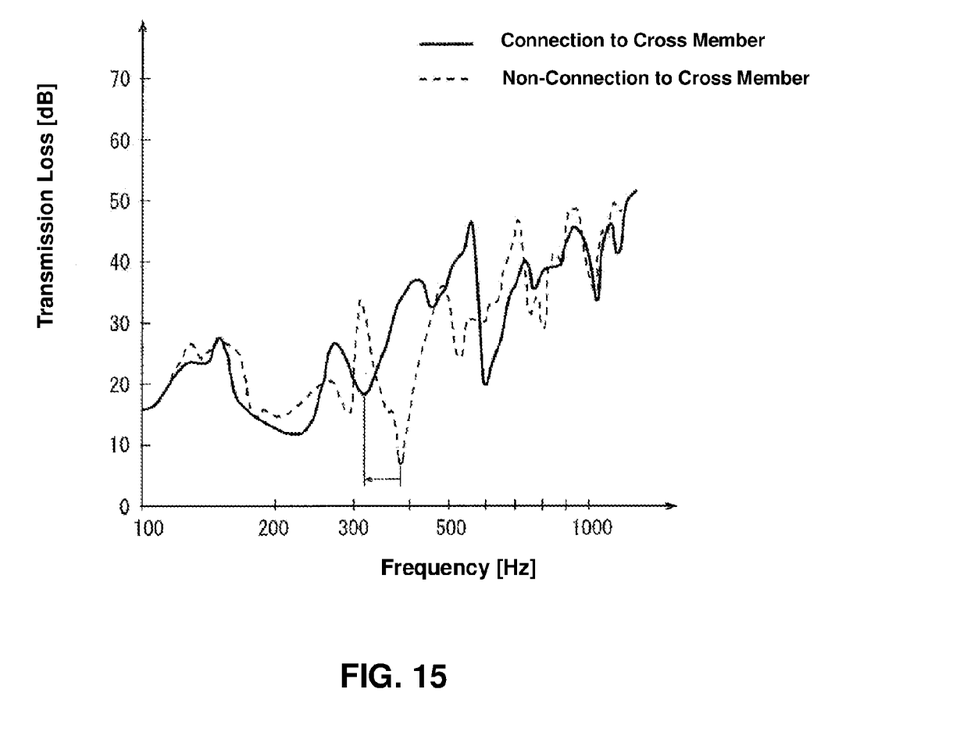
FIG. 15 is a graph shows simulation results of differences in the transmission loss.

FIG. 15 is a graph shows simulation results of differences in the transmission loss between a case of connection to the closed cross section of the cross member and a case of non-connection to that. According to FIG. 15, it is understood that the bottom of the transmission loss around the frequency of 400 Hz in the case of non-connection shifts to a position around the frequency of 300 Hz in the case of connection.

The present invention should not be limited to the above-described embodiments, and any other modifications or improvements may be applied within the scope of a spirit of the present invention. The floor carpet 20 may be configured such that two split sheets of carpet are arranged on right-and-left sides of the tunnel portion 4 or plural split sheets of carpet corresponding to the floor pan portions 1A-1F are arranged, for example. Thus, the number of split sheets of carpet or their arrangement position can be selected properly. The pressing member 40 may be fixed to the vehicle-body side so that it can press the seal member 30 after the floor carpet 20 has been placed on the floor panel 1. The seal member 30 may be an adhesive agent. In this case, the sealed structure can be provided without using the pressing member 40.

What is claimed is:

1. A noise insulation structure of a cabin floor, comprising:
   a floor panel forming a cabin floor surface;
   a floor carpet placed on the floor panel, the floor carpet comprising a skin layer which is configured to block an airflow therethrough and a sound-absorption layer which is made of a sound-absorption material and configured to allow an airflow therein, the sound-absorption layer being provided below the skin layer to contact the floor panel at a lower face thereof; and
   a seal member configured to block an airflow therethrough, the seal member being provided below the skin layer of the floor carpet, surrounding the sound-absorption layer, to contact the floor panel at a lower face thereof such that a space between the skin layer and the floor panel, where the noise-absorption layer is provided, is sealed therewith.

2. The noise insulation structure of the cabin floor of claim 1, wherein said floor panel comprises plural substantially-flat floor pan portions which are formed in a longitudinally-and-laterally split manner, and said seal member is configured to surround each peripheral portion of said plural floor pan portions.

3. The noise insulation structure of the cabin floor of claim 1, wherein said seal member is pressed against said floor panel by using a pressing member which is detachably fixed to a vehicle-body reinforcing member positioned adjacent to the floor panel with a fixing tool.

4. The noise insulation structure of the cabin floor of claim 1, wherein said seal member is formed integrally with the skin layer of said floor carpet.

5. The noise insulation structure of the cabin floor of claim 3, wherein said seal member and said pressing member are respectively formed integrally with the skin layer of said floor carpet.

6. The noise insulation structure of the cabin floor of claim 1, wherein a flat portion having a flat upper face is formed on a vehicle-body side, and said seal member contacts said flat portion.

7. The noise insulation structure of the cabin floor of claim 6, wherein said flat portion is provided by forming a shoulder portion partially at said floor panel or at a reinforcing member positioned at a peripheral portion of the floor panel.

8. The noise insulation structure of the cabin floor of claim 1, wherein said seal member is made of a foamed rubber-based seal material.

9. The noise insulation structure of the cabin floor of claim 1, wherein said sealed space is configured to connect to a space of a closed cross section of a vehicle-body reinforcing member provided adjacent to said floor panel.

10. The noise insulation structure of the cabin floor of claim 9, wherein said vehicle-body reinforcing member is a cross member extending in a vehicle width direction on said floor panel, which is joined to the floor panel via a flange portion thereof, and a protrusion portion to connect said space of the closed cross section of the cross member to said sound-absorption layer of the floor carpet is provided at said flange portion of the cross member.

* * * * *